(12) United States Patent
Kim (10) Patent No.: US 8,781,659 B2
(45) Date of Patent: Jul. 15, 2014

(54) TECHNIQUE FOR CONTROLLING TRANSITION BETWEEN EV MODE AND HEV MODE IN HYBRID VEHICLE

(75) Inventor: Jeong Eun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 284 days.

(21) Appl. No.: 13/428,578

(22) Filed: Mar. 23, 2012

(65) Prior Publication Data

US 2013/0166118 A1 Jun. 27, 2013

(30) Foreign Application Priority Data

Dec. 26, 2011 (KR) .................. 10-2011-0142115

(51) Int. Cl.
*B60L 9/00* (2006.01)

(52) U.S. Cl.
USPC ............ 701/22; 701/51; 701/58; 701/103; 701/123; 903/930; 903/945; 903/946; 180/65.6; 180/65.21; 180/65.8; 477/3; 477/7

(58) Field of Classification Search
CPC . B60W 10/00; B60W 20/00; B60W 2510/10; B60W 2540/103
USPC ........ 701/103, 123, 22, 51, 58; 903/930, 945, 903/946; 180/65.6, 65.2, 65.8, 65.3, 7
See application file for complete search history.

(56) References Cited

U.S. PATENT DOCUMENTS

| | | | | |
|---|---|---|---|---|
| 6,827,167 B2* | 12/2004 | Cikanek et al. | ............. | 180/65.6 |
| 2003/0183431 A1* | 10/2003 | Cikanek et al. | ............. | 180/65.6 |
| 2009/0240387 A1* | 9/2009 | Kawai et al. | .................... | 701/22 |
| 2011/0068895 A1* | 3/2011 | Gee et al. | ..................... | 340/5.67 |
| 2013/0166118 A1* | 6/2013 | Kim | ............................... | 701/22 |
| 2013/0311018 A1* | 11/2013 | Nissato | ........................... | 701/22 |

FOREIGN PATENT DOCUMENTS

| | | |
|---|---|---|
| JP | 2001292502 A | 10/2001 |
| JP | 2004056867 A | 2/2004 |
| JP | 2005160269 A | 6/2005 |
| JP | 2008-168700 A | 7/2008 |
| KR | 10-0669470 | 1/2007 |
| KR | 10-0957332 | 1/2010 |

* cited by examiner

*Primary Examiner* — Redhwan k Mawari (74) *Attorney, Agent, or Firm* — Edwards Wildman Palmer LLP; Peter F. Corless (57) ABSTRACT

Disclosed is a technique for controlling transition between an electric vehicle (EV) mode and a hybrid electric vehicle (HEV) mode in a hybrid vehicle. More specifically, the technique includes first determining a drive mode of the hybrid vehicle by monitoring an average vehicle speed and an accelerator position sensor. Next, an engine on map value is determined for entering into the HEV mode and a hysteresis map value is determined for controlling the transition between the EV mode and the HEV mode based on a battery's state-of-charge (SOC), the average vehicle speed, and the drive mode; Based on the above steps, the technique determines whether the hybrid vehicle should transition between the EV mode or the HEV mode based on a driver's requisite torque calculated by monitoring the accelerator position sensor and a gear position sensor and on the determined engine on map value and hysteresis map value.

20 Claims, 5 Drawing Sheets

FIG.1

(PRIOR ART)

TECHNIQUE FOR CONTROLLING TRANSITION BETWEEN EV MODE AND HEV MODE IN HYBRID VEHICLE

CROSS-REFERENCE TO RELATED APPLICATION

This application claims under 35 U.S.C. §119(a) the benefit of Korean Patent Application No. 10-2011-0142115 filed Dec. 26, 2011, the entire contents of which are incorporated herein by reference.

BACKGROUND (a) Technical Field

The present invention relates to a technique for controlling transitioning between an electric vehicle (EV) mode and a hybrid electric vehicle (HEV) mode in a hybrid vehicle. More particularly, it relates to a technique for controlling transitioning between an EV mode and an HEV mode in a hybrid vehicle, which determines a drive mode of the hybrid vehicle and determines an engine on map value and a hysteresis map value, which are related to the transition between the EV mode and the HEV mode, differently for each drive mode.

(b) Background Art

A hybrid vehicle is a vehicle that is powered two or more power sources. On well known hybrid vehicle is a gas/electric hybrid vehicle which is powered by both a gasoline engine and an electric motor. When the hybrid vehicle is driven by the gasoline engine in an inefficient driving environment, the efficiency of the overall system can be improved by charging or discharging the electric motor (load leveling). Moreover, during deceleration driving, frictional heat generated during a braking operation is converted into kinetic energy and emitted to the air. Here, it is possible to generate electricity (i.e., through a regenerative braking process) using the kinetic energy supplied by the braking action to rotate the electric motor in reverse and store the resulting electricity in a battery, thereby improving the fuel efficiency of the hybrid vehicle.

However, in a hybrid vehicle, the on/off control of the gasoline engine and the control of power distribution between the engine and the motor have a significant effect on the fuel efficiency and driving performance of the hybrid vehicle overall. Moreover, the on/off control of the engine and the control of power distribution between the engine and the motor are associated with various factors such as, for example, the vehicle's speed which his measured by a vehicle speed sensor, a value measured by an accelerator position sensor (APS), a value measured by a gear position sensor, a battery's state-of-charge (SOC), etc., and thus the on/off control of the engine and the control of power distribution between the engine and the motor are performed based on the combination of these factors.

In particular, it is often important to appropriately determine a specific time for transition between the EV mode and the HEV mode so that the battery's SOC is maintained within a normal range. That is, the hybrid system is controlled so that the EV region is reduced and the HEV region is extended when the battery's SOC is below a predetermined value and a driver's torque requisition is above a predetermined value. Conversely, the HEV region is reduced and the EV region is extended when the battery's SOC is above a second predetermined value and the driver's torque requisition is below another predetermined value.

Figure 1:
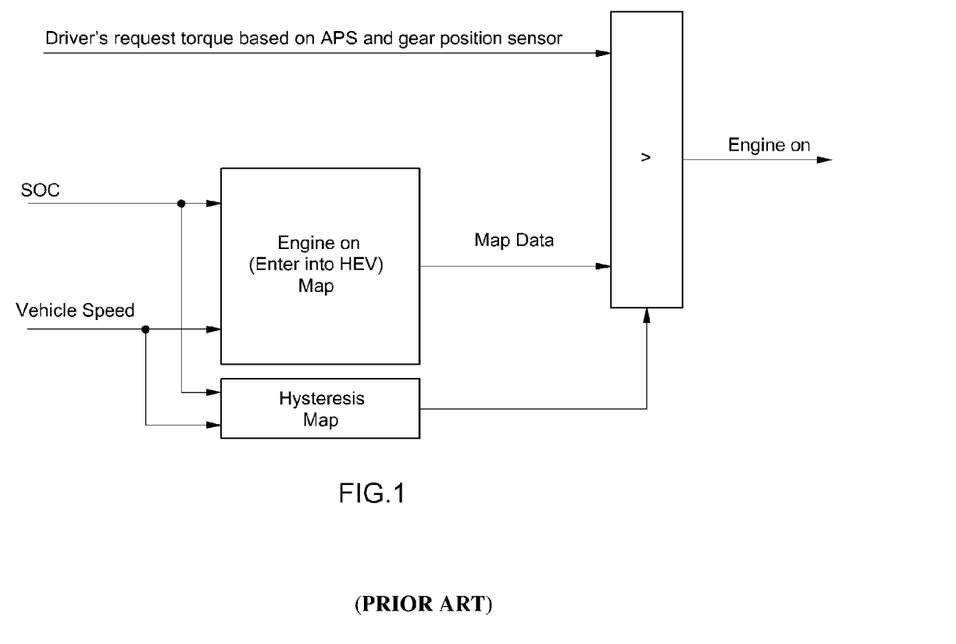
FIG. 1 is a schematic diagram showing a conventional method for controlling transition between an EV mode and an HEV mode in a hybrid vehicle.

FIG. 1 is a schematic diagram showing a conventional technique for controlling transition between an EV mode and an HEV mode in a hybrid vehicle, in which the transition between the EV mode and the HEV mode is controlled based on the following factors. First, an engine on map value for entering the HEV mode is determined based on the battery's SOC and the vehicle speed. Moreover, a hysteresis map value is determined based on the battery's SOC and the vehicle speed to prevent frequent transition between the EV mode and the HEV mode. Furthermore, the driver's torque requisition is calculated by monitoring the accelerator position sensor and the gear position sensor.

Then, it is determined whether the vehicle enters into the EV mode or the HEV mode based on the determined engine on map value and hysteresis map value and the calculated driver torque requisition. That is, when the driver's torque requisition is greater than the engine on map value and exceeds the hysteresis map value, the vehicle enters into the HEV mode and, when the driver's request torque is smaller than the engine on map value and exceeds the hysteresis map value, the vehicle enters into the EV mode.

However, when the engine on map value and the hysteresis map value are determined based on only by the battery's SOC and the vehicle speed in the conventional control technique, the on/off control of the engine and the control of power distribution between the engine and the motor may be inefficient. In other words, the conventional control technique does not reflect other variables that may affect the on/off control of the engine and the control of power distribution between the engine and the motor, thereby having a negative impact on the fuel efficiency and driving performance of the hybrid vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a technique for controlling transition between an EV mode and an HEV mode in a hybrid vehicle, which determines an engine on map (first) value and a hysteresis map (second) value differently for each drive mode of the hybrid vehicle to more efficiently manage a battery's state-of-charge (SOC) during driving of the hybrid vehicle, thereby improving the fuel efficiency of the vehicle.

In one aspect, the present invention provides a method for controlling transition between an electric vehicle (EV) mode and a hybrid electric vehicle (HEV) mode in a hybrid vehicle, the method comprising: a first step of determining, by a controller, a drive mode of the vehicle by monitoring an average vehicle speed and an accelerator position sensor; a second step of determining, by the controller, an engine on map value for entering into the HEV mode and a hysteresis map value for controlling the transition between the EV mode and the HEV mode based on a battery's state-of-charge (SOC), the average vehicle speed, and the drive mode; and a third step of determining, by the controller, to transition the vehicle into either an EV mode or the HEV mode based on a driver's torque requisition calculated by monitoring the accelerator position sensor and a gear position sensor and based on the determined engine on map value and hysteresis map value.

In an exemplary embodiment, when the drive mode is determined to be a low-speed drive mode in the first step, the engine on map value is determined to be lower than that in a normal drive mode in the second step.

In another exemplary embodiment, when the drive mode is determined to be a high-speed drive mode in the first step, the engine on map value is determined to be higher than that in a normal drive mode in the second step.

In still another exemplary embodiment, in the second step, the engine on map value and the hysteresis map value may be determined by further reflecting at least one of a driver's tendency variable and an environmental variable.

In yet another exemplary embodiment, the driver's tendency variable may be divided into a first tendency and a second tendency, and the first tendency and the second tendency may be determined based on the monitoring of the accelerator position sensor, a change in the monitored value, the average vehicle speed, a change in the average vehicle speed, and the number of kickoffs.

In still yet another exemplary embodiment, when the driver's tendency variable is determined as the first tendency, the engine on map value may be determined to be lower than that in the normal drive mode before the driver's tendency variable is reflected and the hysteresis map value may be determined to be higher than that in the normal drive mode before the driver's tendency variable is reflected, and when the driver's tendency variable is determined as the second tendency, the engine on map value and the hysteresis map value may be determined in a manner opposite to the case where the driver's tendency variable is determined as the first tendency.

In a further exemplary embodiment, the environmental variable may be divided into a first environment and a second environment, and the first environment and the second environment may be determined based on the slope of a road, the altitude of the road, and the external and internal temperatures of the vehicle.

In another further exemplary embodiment, when the environmental variable is determined to be the first environment, the engine on map value may be determined to be lower than that in the normal drive mode before the environmental variable is reflected and the hysteresis map value may be determined to be higher than that in the normal drive mode before the environmental variable is reflected, and when the environmental variable is determined to be the second environment, the engine on map value and the hysteresis map value may be determined in a manner opposite to the case where the environmental variable is determined as the first tendency.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Figure 2:
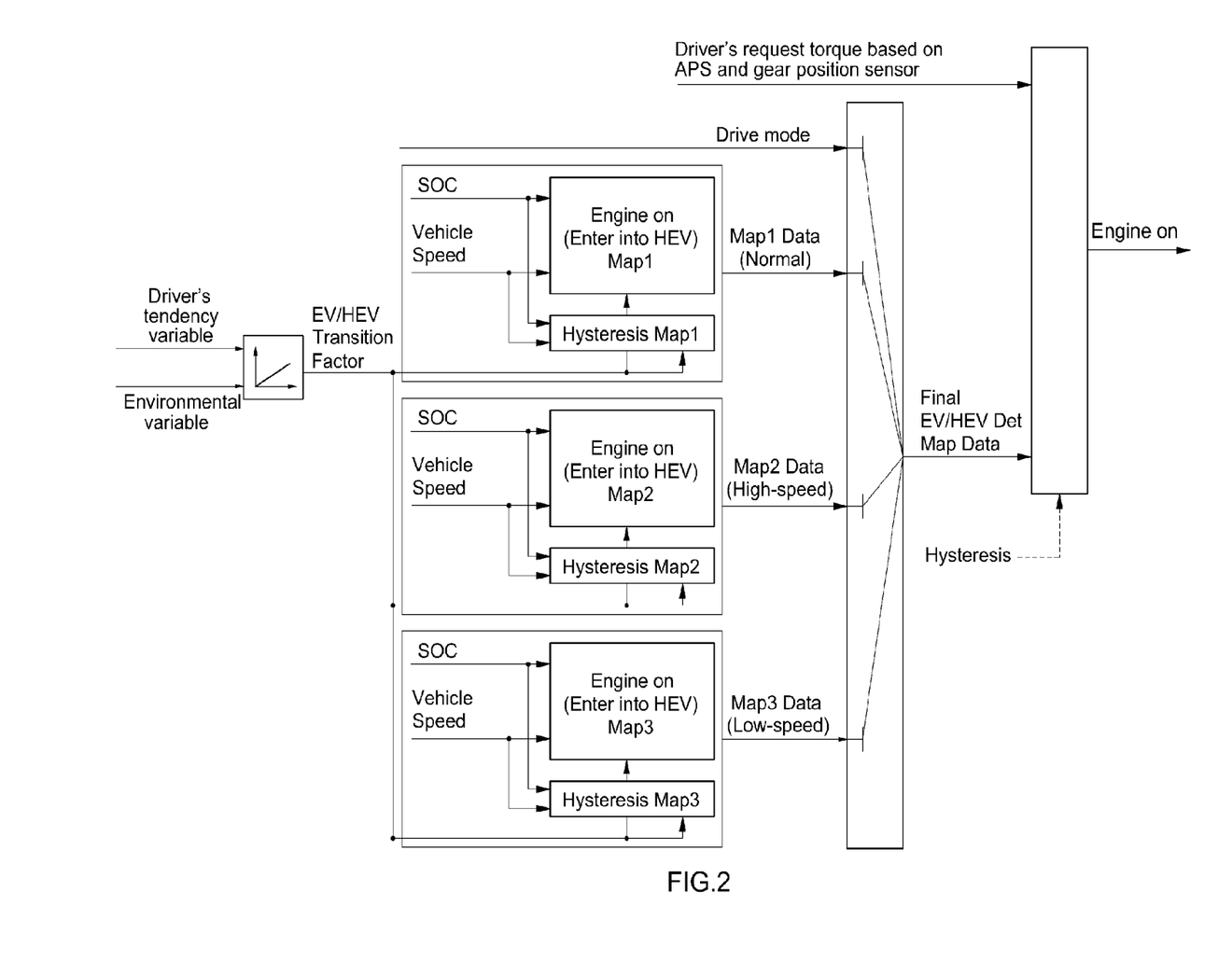
FIG. 2 is a schematic diagram showing a method for controlling transition between an EV mode and an HEV mode in a hybrid vehicle in accordance with an exemplary embodiment of the present invention.
Figure 4:
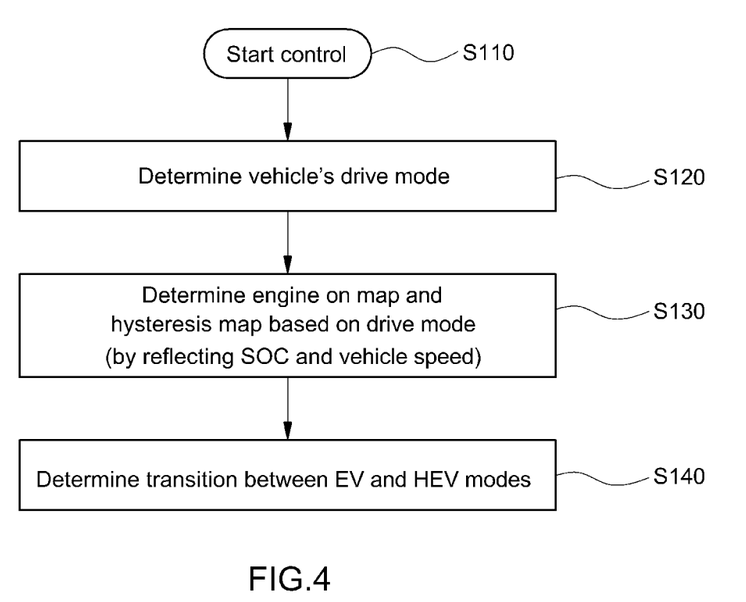
FIG. 4 is a flowchart showing a method for controlling transition between an EV mode and an HEV mode in a hybrid vehicle in accordance with an exemplary embodiment of the present invention.

FIG. 2 is a schematic diagram showing a technique for controlling transition between an EV mode and an HEV mode in a hybrid vehicle in accordance with an exemplary embodiment of the present invention, and FIG. 4 is a flowchart showing a technique for controlling transition between an EV mode and an HEV mode in a hybrid vehicle in accordance with an exemplary embodiment of the present invention.

A method for controlling transition between an EV mode and an HEV mode in a hybrid vehicle in accordance with an exemplary embodiment of the present invention comprises a first step of determining, by e.g. a controller, a drive mode of the vehicle by monitoring an average vehicle speed and an accelerator position sensor (APS); a second step of determining an engine on map value for entering into the HEV mode and a hysteresis map value for controlling the transition between the EV mode and the HEV mode based on a battery's state-of-charge (SOC), the average vehicle speed and the drive mode; and a third step of determining the EV mode or the HEV mode based on a driver's request torque calculated by monitoring the accelerator position sensor and a gear position sensor and based on the determined engine on map value and hysteresis map value.

When the control method of the present invention is started (S110), the drive mode of the vehicle is determined by monitoring the average vehicle speed and the accelerator position sensor (in the first step, S120). The drive mode of the vehicle may automatically change without any special operation during driving, and the determination of the drive mode may be performed at regular intervals or continuously. Here, the drive mode of the vehicle may include a normal drive mode, a low-speed drive mode, and a high-speed drive mode, as well other drive modes. The transition to the low-speed drive mode may occur when the vehicle is driven frequently in the EV mode due to, e.g., slow driving in heavy traffic or when the battery's SOC is very low. The transition to the high-speed drive mode may occur when the battery's SOC is maintained at a predetermined level as it is driven at high speed, e.g., on a highway.

Then, the engine on map value and the hysteresis map value are determined based on the battery's SOC, the average vehicle speed, and the drive mode (in the second step, S130). When the determined engine on map value is satisfied, the system transitions into the HEV mode, and the transition between the EV mode and the HEV mode is controlled based on the determined hysteresis map value. More specifically, the hysteresis map value is a value which prevents frequent transition between the EV mode and the HEV mode.

Here, as shown in FIG. 2, in the normal drive mode for example, map1 data including the engine on map value and the hysteresis map value, which are determined based on the battery's SOC and the average vehicle speed, may be transmitted. Moreover, when the engine on map value and the hysteresis map value are determined to be in the low-speed drive mode, the engine on map value is determined to be lower than that in the normal drive mode based on the battery's SOC, the average vehicle speed, and the characteristics of the low-speed drive mode where the low-speed driving region occurs frequently. Map2 data including the engine on map value and the hysteresis map value, which are determined in the above manner, may be transmitted.

Furthermore, when the engine on map value and the hysteresis map value are determined to be in the high-speed drive mode, the engine on map value may be determined to be higher than that in the normal drive mode based on the battery's SOC, the average vehicle speed, and the characteristics of the high-speed drive mode where the high-speed driving region lasts long. Map3 data including the engine on map value and the hysteresis map value, which are determined in the above manner, may be transmitted.

Thus, the controller is configured to continuously determine the drive mode of the vehicle so that the hybrid vehicle is driven in either the EV mode or the HEV mode based on the driver's requisite torque, the engine on map value, and the hysteresis map value (in the third step, S140). The driver's requisite torque is calculated by monitoring the accelerator position sensor and the gear position sensor. This calculation is not limited to performance during any one of the above steps, and thus, the driver's requisite torque may be calculated by monitoring the accelerator position sensor and the gear position sensor at any time before the above step.

Here, since the engine on map value is determined to be lower than that in the normal drive mode when the drive mode is determined to be in a low-speed drive mode, the hybrid vehicle easily enters into the HEV mode. Moreover, since the engine on map value is determined to be higher than that in the normal drive mode when the drive mode is in the high-speed mode, the region where the hybrid vehicle is driven in the EV mode can be extended accordingly.

As mentioned above, according to the technique for controlling transition between the EV mode and the HEV mode in a hybrid vehicle in accordance with the exemplary embodiment of the present invention, the transition between the EV mode and the HEV mode are controlled in a different manner for each drive mode, and thus it is possible to stably control the battery's SOC and improve the fuel efficiency.

Figure 5:
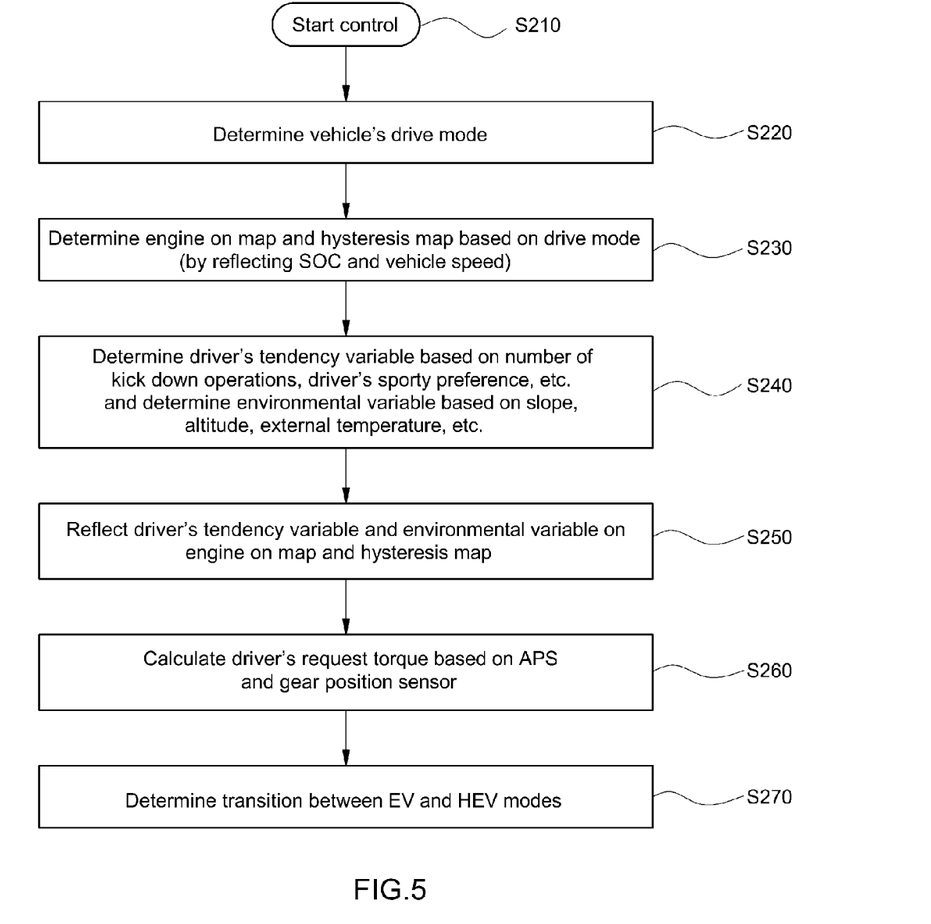
FIG. 5 is a flowchart showing a method for controlling transition between an EV mode and an HEV mode in a hybrid vehicle in accordance with another exemplary embodiment of the present invention.

Meanwhile, another exemplary embodiment of the present invention will be described with reference to FIG. 5 below. FIG. 5 is a flowchart showing a method for controlling transition between an EV mode and an HEV mode in a hybrid vehicle in accordance with another exemplary embodiment of the present invention. When the control method of the illustrative embodiment of the present invention is initiated (S210), a drive mode of the vehicle is determined by monitoring an average vehicle speed and an accelerator position sensor (in the first step, S220). Then, an engine on map value for entering the HEV mode and a hysteresis map value for controlling the transition between the EV mode and the HEV mode are determined based on the battery's SOC, the average vehicle speed, and the drive mode (in the second step, S230).

Here, either a driver tendency variable and/or an environmental variable may be further reflected in addition to the engine on map value, the hysteresis map value, as well as the battery's SOC, the average vehicle speed, and the drive mode (S250). To this end, a step of determining the driver's tendency variable and the environmental variable are performed (S240).

In detail, the driver's tendency variable is an index that indicates the driver's driving style, habit, or preference and may be divided into a first tendency and a second tendency. The criteria to determine the driver's tendency may include monitoring of the accelerator position sensor, a change in the monitored value, the average vehicle speed, a change in the average vehicle speed, the number of kickoffs, which mean that the driver shifts to lower gear, etc.

The case when the driver's tendency variable determined as the first tendency is reflected in a certain drive mode corresponds to the case when the driver exhibits a "sport-like" driving style, e.g., enjoys driving at high speeds. Thus, it is preferred that the engine on map value should be lower than that in the normal drive mode before the driver tendency variable is reflected and the hysteresis map value should be determined to be higher than that in the normal drive mode before the driver tendency variable is reflected. That is, if the first tendency is reflected, the entry into the HEV mode is facilitated by controlling the engine on map value via e.g., a controller or hybrid control unit (HCU), and the transition between the EV mode and the HEV mode performed less by controlling the hysteresis map value.

On the contrary, when the driver tendency variable is a second tendency, the driver has a habit of driving the vehicle carefully or less aggressively, rather than driving at high speeds. Thus, it is preferred that the engine on map value and the hysteresis map value are opposite that of a driver associated with a first tendency value. Moreover, when the driver tendency variable is reflected, the environmental variable, which will be described later, may be reflected together with the second tendency variable.

Figure 3:
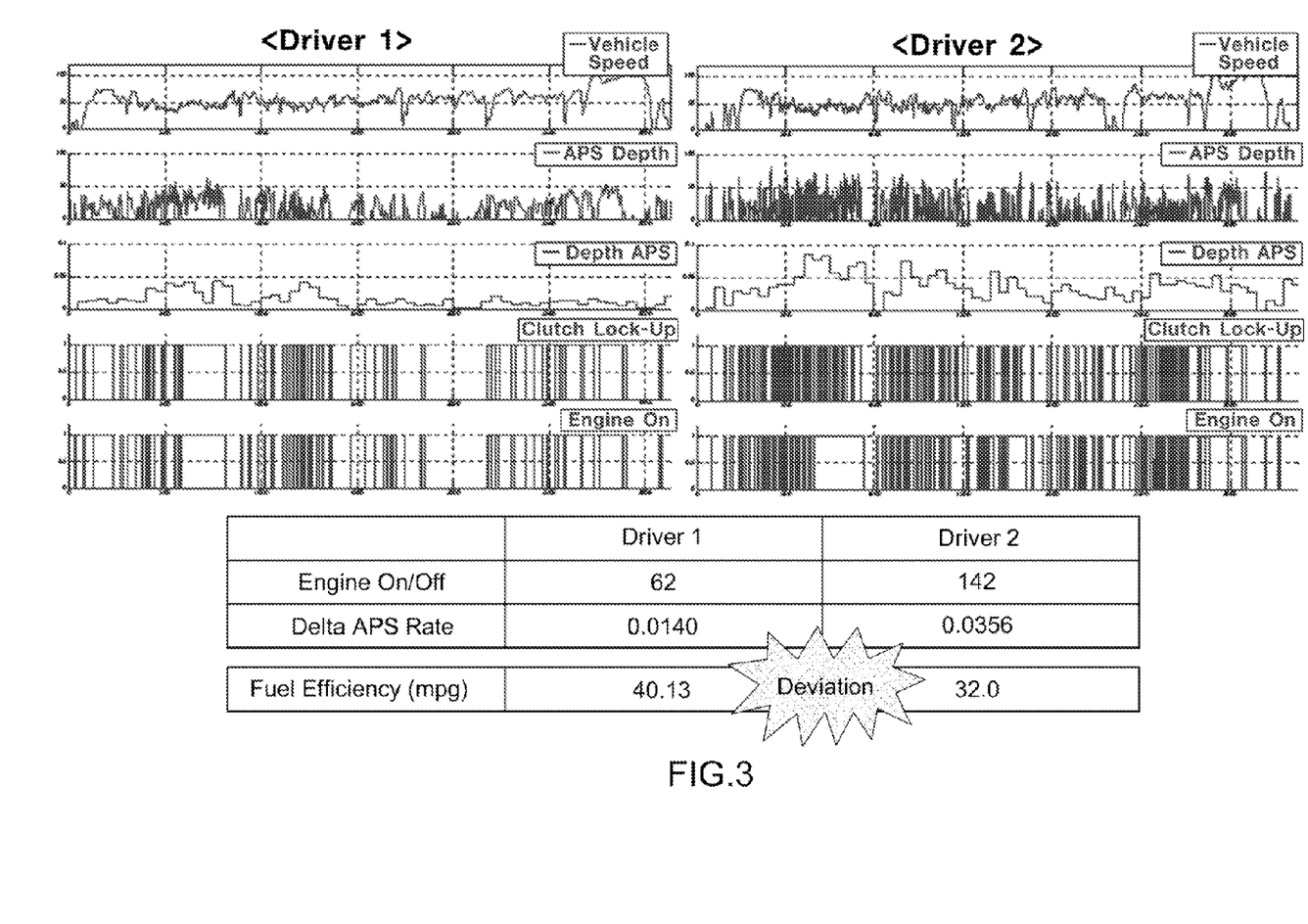
FIG. 3 is a diagram showing differences in vehicle fuel efficiency and battery's SOC based on a driver's tendency variable shown in FIG. 2.

In particular, it can be seen from FIG. 3 that the driver tendency variable is one of the indexes that should be reflected in the control method. FIG. 3 is a diagram showing differences in vehicle fuel efficiency and battery's SOC based on the driver tendency variable shown in FIG. 2. Referring to the driving types of a first driver and a second driver, the number iterations in which engine on/off events occur are 62 iterations for the first driver and 142 iterations for the second driver, and the changes in the values measured by the accelerator position sensor are 0.0140 and 0.0356. As a result, the fuel efficiency recorded by the first driver in the same vehicle is 40.13, while the fuel efficiency recorded by the second driver is 32.0. Thus, this data indicates that the change in fuel efficiency may occur based on the driver's tendency variable.

However, as discussed above, an environmental variable may also be incorporated into the calculation to further increase fuel efficiency in certain situations. The environmental variable is an index that has an effect on the fuel efficiency other than the above-described driver tendency variable and may be divided into a first environment and a second environment. The criteria to determine the environmental variable may include the slope of a road, the altitude of the road, the external and internal temperatures of the vehicle, etc.

The environmental variable applied to a certain drive mode may be determined to be the first environment when the slope of the road is, e.g., steep, the vehicle is being driven at a to high altitude, or the use of an air conditioner is required, e.g., where the external temperature of the vehicle or the internal temperature of the battery is high. Thus, it is preferred that the engine on map value be determined to be lower than that in the normal drive mode before the environmental variable is reflected and the hysteresis map value should be determined to be higher than that in the normal drive mode before the environmental variable is reflected. That is, if the environmental variable determined as the first environment is reflected, the entry into the HEV mode is facilitated by controlling the engine on map value, and the transition between the EV mode and the HEV mode is performed less often by controlling the hysteresis map value.

On the contrary, the environmental variable applied to certain drive mode is determined to be a second environment when the vehicle is driven on a flat road with little or no slope or when the external temperature of the vehicle or the internal temperature of the battery is an appropriate level. Thus, it is preferred that the engine on map value and the hysteresis map value be determined in a manner opposite to that of the first environmental variable. Moreover, when the environmental variable is reflected, the above-described driver tendency variable may be reflected together with the identified environmental variable As such, when the engine on map value and the hysteresis map value are determined, it is possible to reflect a driver tendency variable and/or an environmental variable, together with the battery's SOC, the average vehicle speed, and the drive mode including the normal drive mode, the high-speed drive mode, and the low-speed drive mode in the method for controlling the transition between the EV mode and the HEV mode in a hybrid vehicle in accordance with another exemplary embodiment of the present invention.

In other words, as shown in FIG. 2, in the normal drive mode, map1 data including the engine on map value and the hysteresis map value, which are determined, based on the battery's SOC, the average vehicle speed, and at least one of the driver's tendency variable and the environmental variable, may be transmitted. Moreover, when the engine on map value and the hysteresis map value are determined in the low-speed drive mode, map2 data including the engine on map value and the hysteresis map value, which is determined based on the battery's SOC, the average vehicle speed, and at least one of the driver's tendency variable and the environmental variable, may be transmitted. Furthermore, when the engine on map value and the hysteresis map value are determined in the high-speed drive mode, map3 data including the engine on map value and the hysteresis map value, which is determined, based on the battery's SOC, the average vehicle speed, and at least one of the driver's tendency variable and the environmental variable, may be transmitted.

The driver's requite torque may be continuously calculated by monitoring the accelerator position sensor and the gear position sensor (S260). This calculation may be performed at any point in time and is not limited as such. Then, the hybrid vehicle is driven in either the EV mode or the HEV mode determined based on the calculated driver requisite torque, the engine on map value, and the hysteresis map value (in the third step, S270).

As described above, according to the system and method for controlling the transition between the EV mode and the HEV mode in a hybrid vehicle according to the illustrative embodiments of the present invention, the transition between the EV mode and the HEV mode is controlled in a different manner for each drive mode including the normal drive mode, the high-speed drive mode, and the low-speed drive mode, and thus it is possible to stably control the battery's SOC and improve the fuel efficiency of the vehicle.

Moreover, the transition between the EV mode and the HEV mode is controlled in a different manner for each drive mode by further reflecting a driver tendency variable by e.g., monitoring of the accelerator position sensor, the average vehicle speed, the number of kickoffs, etc. and an environmental variable such as the slope of the road, the altitude of the road, the external and internal temperatures of the vehicle, etc., and thus it is possible to improve the fuel efficiency by increasing the driving stability of the hybrid vehicle and to increase the quality of the product by providing optimal driving performance.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a to distributed fashion, e.g., by a telematics server or a Controller Area Network (CAN).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling transition between an electric vehicle (EV) mode and a hybrid electric vehicle (HEV) mode in a hybrid vehicle, the method comprising:
   determining, by a controller, a drive mode of the hybrid vehicle by continuously monitoring an average vehicle speed and an accelerator position sensor;
   determining, by the controller, a first value for entering into the HEV mode and a second value for controlling the transition between the EV mode and the HEV mode based on a battery's state-of-charge (SOC), the average vehicle speed, and the drive mode; and
   determining, by the controller, whether the hybrid vehicle should be in EV mode or HEV mode based on a driver's requisite torque, the driver's requisite torque calculated by continuously monitoring the accelerator position sensor and a gear position sensor and based on the determined first value and second value.

2. The method of claim 1, wherein when the drive mode is determined to be a low-speed drive mode by the controller, the first value is determined to be lower than the first value would be in a normal drive mode.

3. The method of claim 1, wherein when the drive mode is determined to be a high-speed drive mode by the controller, the first value is determined to be higher than the first value would be in a normal drive mode.

4. The method of claim 1, wherein the first value is an engine on map value and the second value is a hysteresis map value, and both values are determined based further on at least one of a driver tendency variable and an environmental variable.

5. The method of claim 4, wherein the driver tendency variable is divided into a first tendency and a second tendency, the first tendency and the second tendency being determined based on the monitored accelerator position sensor, a change in the monitored value, the average vehicle speed, a change in the average vehicle speed, and a number of kickoffs.

6. The method of claim 5, wherein when the driver tendency variable is determined to be the first tendency, the engine on map value is determined to be lower than the engine on map value would be in the normal drive mode before the driver tendency variable is reflected and the hysteresis map value is determined to be higher than the hysteresis value would be in the normal drive mode before the driver tendency variable is reflected, and
wherein when the driver tendency variable is determined to be the second tendency, the engine on map value and the hysteresis map value are determined in a manner opposite to when the driver tendency variable is determined to be the first tendency.

7. The method of claim 4, wherein the environmental variable is divided into a first environment and a second environment, the first environment and the second environment being determined based on a slope of a road, an altitude of the road, and external and internal temperatures of the hybrid vehicle.

8. The method of claim 7, wherein when the environmental variable is determined as the first environment, the engine on map value is determined to be lower than the engine on map value would be in the normal drive mode before the environmental variable is reflected and the hysteresis map value is determined to be higher than the hysteresis value would be in the normal drive mode before the environmental variable is reflected, and
wherein when the environmental variable is determined as the second environment, the engine on map value and the hysteresis map value are determined to be opposite that of the first tendency.

9. A non-transitory computer readable medium containing program instructions executed by a controller, the computer readable medium comprising:
program instructions that determine a drive mode of the hybrid vehicle by continuously monitoring an average vehicle speed and an accelerator position sensor;
program instructions that determine a first value for entering into the HEV mode and a second value for controlling the transition between the EV mode and the HEV mode based on a battery's state-of-charge (SOC), the average vehicle speed, and the drive mode; and
program instructions that determine whether the hybrid vehicle should be in EV mode or HEV mode based on a driver's requisite torque, the driver's requisite torque calculated by continuously monitoring the accelerator position sensor and a gear position sensor and based on the determined first value and second value.

10. The non-transitory computer readable of claim 9, wherein when the drive mode is determined to be a low-speed drive mode by the controller, the first value is determined to be lower than the first value would be in a normal drive mode.

11. The non-transitory computer readable of claim 9, wherein when the drive mode is determined to be a high-speed drive mode by the controller, the first value is determined to be higher than the first value would be in a normal drive mode.

12. The non-transitory computer readable of claim 9, wherein the first value is an engine on map value and the second value is a hysteresis map value, and both values are determined based further on at least one of a driver tendency variable and an environmental variable.

13. The non-transitory computer readable of claim 12, wherein the driver tendency variable is divided into a first tendency and a second tendency, the first tendency and the second tendency being determined based on the monitored accelerator position sensor, a change in the monitored value, the average vehicle speed, a change in the average vehicle speed, and a number of kickoffs.

14. The non-transitory computer readable of claim 13, wherein when the driver tendency variable is determined to be the first tendency, the engine on map value is determined to be lower than the engine on map value would be in the normal drive mode before the driver tendency variable is reflected and the hysteresis map value is determined to be higher than the hysteresis value would be in the normal drive mode before the driver tendency variable is reflected, and
wherein when the driver tendency variable is determined to be the second tendency, the engine on map value and the hysteresis map value are determined in a manner opposite to when the driver tendency variable is determined to be the first tendency.

15. The non-transitory computer readable of claim 12 wherein the environmental variable is divided into a first environment and a second environment, the first environment and the second environment being determined based on a slope of a road, an altitude of the road, and external and internal temperatures of the hybrid vehicle.

16. The non-transitory computer readable of claim 15, wherein when the environmental variable is determined as the first environment, the engine on map value is determined to be lower than the engine on map value would be in the normal drive mode before the environmental variable is reflected and the hysteresis map value is determined to be higher than the hysteresis value would be in the normal drive mode before the environmental variable is reflected, and
wherein when the environmental variable is determined as the second environment, the engine on map value and the hysteresis map value are determined to be opposite that of the first tendency.

17. A hybrid vehicle control system comprising:
an engine and a motor configured to operate in parallel or individually based upon a particular driving mode; and
a controller configured to control the driving mode of the hybrid vehicle, the controller configured to:
determine the drive mode of the hybrid vehicle by continuously monitoring an average vehicle speed and an accelerator position sensor,
determine a first value for entering into a hybrid electric vehicle (HEV) mode and a second value for controlling the transition between an electric vehicle (EV) mode and the HEV mode based on a battery's state-of-charge (SOC), the average vehicle speed, and the drive mode, and determine whether the hybrid vehicle should be in EV mode or HEV mode based on a driver's requisite torque, the driver's requisite torque calculated by continuously monitoring the accelerator position sensor and a gear position sensor and based on the determined first value and second value.

18. The hybrid vehicle control system of claim 17, wherein when the drive mode is determined to be a low-speed drive mode by the controller, the first value is determined to be lower than the first value would be in a normal drive mode.

19. The hybrid vehicle control system of claim 17, wherein when the drive mode is determined to be a high-speed drive mode by the controller, the first value is determined to be higher than the first value would be in a normal drive mode.

20. The hybrid vehicle control system of claim 17, wherein the first value is an engine on map value and the second value is a hysteresis map value, and both values are determined based further on at least one of a driver tendency variable and an environmental variable.

* * * * *